(12) United States Patent
Roush

(10) Patent No.: US 11,718,778 B2
(45) Date of Patent: Aug. 8, 2023

(54) GAS HYDRATE INHIBITORS AND METHOD OF USE THEREOF

(71) Applicant: RK Innovations, LLC, Letart, WV (US)

(72) Inventor: Jamie L. Roush, Mason, WV (US)

(73) Assignee: RK Innovations, LLC, Letart, WV (US)

(*) Notice: Subject to any disclaimer, the term of this patent is extended or adjusted under 35 U.S.C. 154(b) by 0 days.

(21) Appl. No.: 17/462,684

(22) Filed: Aug. 31, 2021

(65) Prior Publication Data

US 2022/0064514 A1 Mar. 3, 2022

Related U.S. Application Data

(60) Provisional application No. 63/073,137, filed on Sep. 1, 2020.

(51) Int. Cl.
*C09K 8/52* (2006.01)

(52) U.S. Cl.
CPC ............ *C09K 8/52* (2013.01); *C09K 2208/22* (2013.01)

(58) Field of Classification Search
None
See application file for complete search history.

(56) References Cited

U.S. PATENT DOCUMENTS

| | | | |
|---|---|---|---|
| 2006/0009363 A1* | 1/2006 | Crews | C09K 8/685 507/100 |
| 2008/0113878 A1* | 5/2008 | Leinweber | C08G 63/6854 507/90 |
| 2008/0214865 A1* | 9/2008 | Leinweber | C09K 8/52 562/590 |
| 2015/0087562 A1* | 3/2015 | Falana | C09K 8/52 507/135 |
| 2015/0152329 A1* | 6/2015 | Seetharaman | C23F 11/149 548/254 |
| 2016/0122619 A1* | 5/2016 | Lucente-Schultz | C09K 8/52 507/90 |
| 2021/0179774 A1* | 6/2021 | Panchalingam | C09K 8/524 |

\* cited by examiner

*Primary Examiner* — John J Figueroa
(74) *Attorney, Agent, or Firm* — The Webb Law Firm

(57) ABSTRACT

Disclosed herein is a gas hydrate inhibitor that includes from 1 to 99% by weight of an alcohol, from 1 to 99% by weight of a polyol, from 0.01 to 2.0% by weight of an organic acid, and from 1 to 99% by weight of water. The gas hydrate inhibitor is useful in preventing and/or removing hydrates in a fluid to ensure a continuous flow of the fluid.

19 Claims, No Drawings

GAS HYDRATE INHIBITORS AND METHOD OF USE THEREOF

CROSS REFERENCE TO RELATED APPLICATIONS

This application claims the benefit of U.S. Provisional Patent Application No. 63/073,137 entitled "Gas Hydrate Inhibitors and Method of Use Thereof", filed on Sep. 1, 2020, which is hereby incorporated by reference in its entirety.

BACKGROUND

Technical Field

The present disclosure relates to gas hydrate inhibitors that comprise an organic acid, an alcohol, a polyol, and water. They are useful in oil and gas exploration, recovery and processing industries.

Background

Gas hydrates are clathrate-type structures consisting of hydrogen-bonded water molecules that form "cages" that are stabilized by captured gas molecules like methane, propane, and $CO_2$. Clathrates, in which a rigid, open network of bonded host molecules, enclose, without direct chemical bonding, appropriately sized guest molecules of another substance. In the case of gas hydrates, water acts as the host molecule, enclosing gas molecules, such as methane, thereby yielding ice-like crystals of gas and water. Gas hydrates are normally formed under conditions of low temperatures and high pressures. During production of oil and gas, water is often co-produced resulting in a multi-phase system containing oil, water, and gas. Additionally, solid organic and inorganic particles may be present.

Gas hydrates have the appearance of ice but can form well above freezing temperatures at high pressures common in the advances made by nonconventional production of shale formations and horizontal drilling. Natural gas pipelines always contain some moisture content of the produced formation. Undulating terrain, various size piping sections, process equipment used for flow control and measurement, flow stimulation procedures, gravity or any disruption to direction of flow can facilitate a location for moisture to accumulate. It is at these points during seasonal cold or under the right thermodynamic conditions, hydrate formation can occur.

Gas hydrates are a growing concern in oil or gas production at least in part because gas hydrates present flow assurance problems in onshore wells, offshore wells, and pipelines. As deepwater drilling and production increases, the problems associated with hydrate formation increase. Deepwater is an ideal breeding ground for the growth of gas hydrates, and when these ice-like crystals form in the circulating system, managing them can be costly and dangerous. For the same reason, as operators search for hydrocarbons in colder regions, such as Siberia, Alaska, and Canada, hydrates increasingly will become a cause of significant production problems.

Well operators and drillers often take precautionary measures by reducing the water available for gas hydrate formation. For example, after a pipeline for the transportation of light hydrocarbons, such as natural gas, has been repaired, constructed, hydro-tested, or otherwise exposed to water, it is mandatory that water remaining in the pipeline be removed. Light hydrocarbon gases are particularly susceptible to forming hydrates with water, which can and often do reduce or block the flow of gases through pipelines.

Gas hydrates offer two distinct problems for the scientists and engineers who design systems to mitigate the hydrate effect. The first problem concerns dissolution. When a hydrate plug forms, it must be melted to unblock the transmission conduit. For example, if a hydrate plug forms at the mudline in a deepwater completion, the operator must find a way to melt the ice plug in situ before production can continue.

The second problem concerns inhibition. The goal is to prevent hydrate formation entirely. However, to inhibit hydrate formation, the inhibitor must be present before a system reaches hydrate-forming conditions (e.g., low-temperature, high-pressure flow regimes). The traditional chemical approach to hydrate inhibition and dissolution has been to add sufficient quantities of an inhibitor to the production system.

Three types of hydrate inhibitors are currently available to the energy industry for controlling gas hydrates: thermodynamic hydrate inhibitors (THIs), kinetic hydrate inhibitors (KHIs), and anti-agglomerants (AAs). THIs are substances that can reduce the temperature at which gas hydrates form at a given pressure and water content. Methanol and ethylene glycol are thermodynamic inhibitors used in the oil industry. However, thermodynamic inhibitors often have to be added in large amounts to be effective, typically in the order of several tens of percent by weight of the water present. Therefore, there is a substantial cost associated with transportation and storage of large quantities of THIs.

A more cost-effective alternative is the use of kinetic hydrate inhibitors and anti-agglomerants, which are known collectively as low-dosage hydrate inhibitors (LDHIs), reflecting the much lower dosage requirements compared with THIs.

Anti-agglomerants are surface active molecules that attach to and disperse fine gas hydrate crystals, preventing their agglomeration and growth into masses that could become plugs. When gas hydrate crystals begin to form, AAs attach thereto making the surface hydrophobic, which mediates the capillary attraction between the crystals and water and disperses the crystals into the hydrocarbon phase. This results in a slurry that can flow to the processing facility.

One problem that arises from the atomization, evaporation, and vaporization of methanol, alcohols, alcohol portions of hydrate inhibitors, and glycol ethers is that they can remain in the gas stream in the form of oxygenates. Hydrate solvent and inhibitor oxygenates are then processed with natural gas through fractionation due to similar molecular weights and properties. These components remain in the form of intact alcohols, as ethers, or as acetaldehydes. The significance of this contamination is the rendering of separated hydrocarbons to no longer meet the required purity, particularly propane HD-5 for export grade, therefore decreasing their value.

Alternatively, gas producers can route the gas through dehydration equipment. However, this can be an expensive and logistically complex addition to the process.

US 2006/0218852 describes compositions useful for controlling formation of hydrates in various fluid systems. The composition comprises polymeric dendritic materials or hyper-branched polyamino polymers.

WO01/77270 describes adding to the mixture an amount of a dendrimeric compound effective to inhibit formation of hydrates at conduit temperatures and pressures, and flowing the mixture containing the dendrimeric compound and any hydrates through the conduit. Preferably, a hyperbranched polyester amide is used as a hydrate formation inhibitor compound.

Many known hydrate inhibitors are polymeric and not safe for the environment. Thus, there is a need for a cost effective and efficient gas hydrate inhibitor that is safe and less environmentally hazardous.

SUMMARY

Disclosed herein are gas hydrate inhibitors. They comprise from 1 to 99% by weight of an alcohol, from 1 to 99% by weight of a polyol, from 0.01 to 2.0% by weight of an organic acid, and from 1 to 99% by weight of water.

Also disclosed herein is a method of making a gas hydrate inhibitor. The method comprises combining water and an organic acid while stirring until the solution is homogeneous thereby making a first solution, blending the first solution with the polyol to form a second solution, and combining the second solution with an alcohol in a volume ratio of from 1:9 to 9:1 thereby forming the gas hydrate inhibitor.

Also disclosed herein is a method for controlling gas hydrate formation and plugging in a gas hydrate forming fluid. The method comprises combining a gas hydrate inhibitor with the hydrate forming fluid present in crude oil, condensate, and/or gas systems containing water; wherein said gas hydrate inhibitor comprises from 1 to 99% by weight of an alcohol, from 1 to 99% by weight of a polyol, from 0.01 to 2.0% by weight of an organic acid, and from 1 to 99% by weight of water, and the amount of gas hydrate inhibitor is sufficient to reduce and/or eliminate the formation of hydrates during the flow of said hydrocarbons compared to hydrate formation if the gas hydrate inhibitor had not been combined with said hydrocarbon

DETAILED DESCRIPTION OF THE INVENTION

As used herein, the singular form of "a", "an", and "the" include plural referents unless the context clearly states otherwise.

For the purposes of this specification, unless otherwise indicated, all numbers expressing quantities or ratios of ingredients, reaction conditions, dimensions, physical characteristics, and so forth used in the specification and claims are to be understood as being modified in all instances by the term "about." Unless indicated to the contrary, the numerical parameters set forth in the following specification and attached claims are approximations that can vary depending upon the desired properties sought to be obtained by the present invention. Each numerical value, unless explicitly stated otherwise, will have a margin of error inherent in the means by which the measurement is made or of ±5%, whichever is greater.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Also, it should be understood that any numerical range recited herein is intended to include all sub-ranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1.

Definitions

As used herein, the terms "gas hydrate inhibitor" and "hydrate inhibitor" denote a composition that, when mixed with a liquid, produces a hydrate inhibited liquid mixture having a lower gas hydrate formation temperature than the original aqueous liquid. Thus, a gas hydrate inhibitor reduces, eliminates, and/or removes hydrates that may form in, for example, a hydrocarbon fluid.

As used herein, the term "alcohol" refers to an organic molecule that comprises the standard organic functional group represented by R—OH.

As used herein, the term "organic acid" refers to an organic molecule that comprises one or more of the standard organic functional group represented by R—CO$_2$H.

In one aspect, disclosed herein is a gas hydrate inhibitor where said gas hydrate inhibitor is a combination of ethylene glycol/ascorbic acid, water and methanol. The ratio of methanol solvent combined with the thermodynamic properties of the ethylene glycol/water mixture provides a freezing point depression well below normally encountered internal piping operational temperatures. The achieved increase in density of the ethylene glycol/water to methanol ratio resists atomization of the product, effectively decreasing product evaporation. Ethylene glycol/water blends have also shown to provide a layer of anticorrosion and antimicrobial growth as well. The produced blend acts as a kinetic, low dosage, hydrate inhibitor, seeking out the exterior walls of piping and valves, absorbing moisture and dissolving any hydrate seeds.

Without being bound by the theory, it is thought that the gas hydrate inhibitor herein has the novel ability to remove a portion of the atomized, evaporated, and/or vaporized alcohols that become oxygenate impurities in a hydrocarbon fluid or gas stream. It solves these problems by actively absorbing superoxide, hydroxyl, peroxyl radicals, and singlet oxygen. Under low temperatures and in the presence of water, the stored and initially injected organic acid remains relatively unreactive within the solution. As water is removed during the steps of purification, the organic acid forms an ester with free alcohols such as methanol that may have been vaporized during the process. This is a direct result of equilibrium being shifted due to a product (water) of esterification being eliminated. Through the heated stages of gas processing (heat exchanger/separators and compression), sufficient activation energy is provided further favoring formation of the ester. The esters formed are harmless products with relatively high surface areas and a relatively high number of polarizable electrons. These two properties coupled with the organic functional groups result in relatively strong intermolecular forces thereby reducing the volatility. This allows the ester to be eliminated with other liquids within the purification process.

In one aspect, disclosed herein is a gas hydrate inhibitor that comprises from 1 to 99% by weight of an alcohol, from 1 to 99% by weight of a polyol, from 0.01 to 2.0% by weight of an organic acid, and from 1 to 99% by weight of water. In some aspects, the gas hydrate inhibitor consists essentially of from 1 to 99% by weight of an alcohol, from 1 to 99% by weight of a polyol, from 0.01 to 2.0% by weight of an organic acid, and from 1 to 99% by weight of water. In some aspects, the gas hydrate inhibitor comprises from 1 to 99% by weight of an alcohol, from 1 to 99% by weight of a polyol, from 0.01 to 2.0% by weight of an organic acid, and from 1 to 99% by weight of water.

In some aspects, the alcohol has 6 or fewer carbon atoms. In some aspects, the alcohol is selected from the group consisting of methanol, ethanol, propanol, isopropanol, butanol, isobutanol, tert-butanol, n-pentanol, isopentanol, hexanol, isohexanol, cyclobutanol, cyclopentanol, methylcyclopentanol, cyclohexanol, and combinations thereof. In some aspects, the alcohol is methanol. In some aspects, the alcohol is ethanol. In some aspects, the alcohol is propanol. In some aspects, the alcohol is isopropanol. In some aspects, the alcohol is butanol. If one alcohol is present, then the alcohol comprises from 1 to 99 weight percent of the gas hydrate inhibitor. In some aspects, the alcohol comprises from 5 to 90 weight percent, from 10 to 85 weight percent, from 15 to 80 weight percent, from 20 to 75 weight percent, from 25 to 70 weight percent, from 30 to 65 weight percent, or from 40 to 60 weight percent. In some aspects, the alcohol comprises 10 weight percent, 15 weight percent, 20 weight percent, 25 weight percent, 30 weight percent, 35 weight percent, 40 weight percent, 45 weight percent, 50 weight percent, 55 weight percent, 60 weight percent, 65 weight percent, 70 weight percent, 75 weight percent, 80 weight percent, 85 weight percent, 90 weight percent, or 95 weight percent.

In some aspects, two or more alcohols are combined. If two alcohols are present, then the weight ratio of the two alcohols is from 1:99 to 99:1. In some aspects, when two or more alcohols are present, the combined amount of the alcohols comprises from 1 to 99 weight percent of the gas hydrate inhibitor. In some aspects, the alcohol may comprise from 5 to 90 weight percent, from 10 to 85 weight percent, from 15 to 80 weight percent, from 20 to 75 weight percent, from 25 to 70 weight percent, from 30 to 65 weight percent, or from 40 to 60 weight percent. In some aspects, the alcohol comprises 10 weight percent, 15 weight percent, 20 weight percent, 25 weight percent, 30 weight percent, 35 weight percent, 40 weight percent, 45 weight percent, 50 weight percent, 55 weight percent, 60 weight percent, 65 weight percent, 70 weight percent, 75 weight percent, 80 weight percent, 85 weight percent, 90 weight percent, or 95 weight percent.

In some aspects, the polyol has 6 or fewer carbons. In some aspects, the polyol is a liquid at 25° C. In some aspects, the polyol is ethylene glycol. In some aspects, the polyol comprises from 1 to 99% by weight. In some aspects, the polyol comprises from 5 to 90 weight percent, from 10 to 70 weight percent, from 15 to 60 weight percent, from 20 to 50 weight percent, or from 25 to 40 weight percent. In some aspects, the polyol comprises 10 weight percent, 15 weight percent, 20 weight percent, 25 weight percent, 30 weight percent, 35 weight percent, 40 weight percent, 45 weight percent, 50 weight percent, 55 weight percent, 60 weight percent, 65 weight percent, 70 weight percent, 75 weight percent, 80 weight percent, 85 weight percent, 90 weight percent, or 95 weight percent.

In some aspects, the organic acid has 10 or fewer carbon atoms. In some aspects, the organic acid is selected from the group consisting of formic acid, acetic acid, glyceric acid, xylonic acid, gluconic acid, ascorbic acid, glucuronic acid, galacturonic acid, iduronic acid, tartaric acid, mucic acid, saccharic acid, and combinations thereof. In some aspects, the organic acid is formic acid. In some aspects, the organic acid is acetic acid. In some aspects, the organic acid is glyceric acid. In some aspects, the organic acid is ascorbic acid. In some aspects, the organic acid is tartaric acid. In each instance, the organic acid may be in the form of the protonated acid or it may be in a salt form where one or more counterions are present. In some aspects, the organic acid comprises from 0.01 to 2.0 weight percent of the gas hydrate inhibitor. In some aspects, the organic acid comprises from 0.01 to 0.1 weight percent. In some aspects, it comprises 0.01 weight percent. In some aspects, it comprises 0.02 weight percent. In some aspects, it comprises 0.03 weight percent. In some aspects, it comprises 0.04 weight percent. In some aspects, it comprises 0.05 weight percent. In some aspects, it comprises 0.06 weight percent. In some aspects, it comprises 0.07 weight percent. In some aspects, it comprises 0.08 weight percent. In some aspects, it comprises 0.09 weight percent. In some aspects, it comprises 0.10 weight percent. In some aspects, it comprises 0.11 weight percent. In some aspects, it comprises 0.12 weight percent. In some aspects, it comprises 0.13 weight percent. In some aspects, it comprises 0.14 weight percent. In some aspects, it comprises 0.15 weight percent. In some aspects, it comprises 0.16 weight percent. In some aspects, it comprises 0.17 weight percent. In some aspects, it comprises 0.18 weight percent. In some aspects, it comprises 0.19 weight percent. In some aspects, it comprises 0.20 weight percent.

In some aspects, two or more organic acids are combined. If two acids are present, then the weight ratio of the two acids is from 1:99 to 99:1. In some aspects, when two or more alcohols are present, the combined amount of the two or more organic acids comprises from 0.01 to 2.0 weight percent of the gas hydrate inhibitor. In some aspects, the organic acid comprises from 0.01 to 0.1 weight percent.

In some aspects the organic acid has two or more acidic functional groups. An acidic functional group is not limited to carboxylic acids; it is any organic functional group that has a hydrogen atom that may be removed using a based. Examples included, but are not limited to, hydroxyl, thiol, amine, sulfonic acid, ketone, aldehyde, and ester. In some aspects, when there are two or more acidic functional groups, at least one of said acid functional groups will have a pKa between 2.0 and 6.0. In some aspects, when there are two or more acidic functional groups, at least one of said acid functional groups will have a pKa between 2.5 and 5.5. In some aspects, when there are two or more acidic functional groups, at least one of said acid functional groups will have a pKa between 3.0 and 5.0.

In some aspects, water is present in the gas hydrate inhibitor. In some aspects, it comprises the remaining amount of the total composition after the other components are accounted for. Thus, in some aspects, water comprises from 1 to 99 weight percent of the gas hydrate inhibitor. In some aspects, water comprises 5 weight percent, 10 weight percent, 15 weight percent, 20 weight percent, 25 weight percent, 30 weight percent, 35 weight percent, 40 weight percent, 45 weight percent, 50 weight percent, 55 weight percent, 60 weight percent, 65 weight percent, 70 weight percent, 75 weight percent, 80 weight percent, 85 weight percent, 90 weight percent, or 95 weight percent of the gas hydrate inhibitor. In some aspects, the water is deionized water. In some aspects, the water is distilled water. In some aspects, the water is standard tap water as provided in a normal municipal water supply. In some aspects, the water is ground water. In some aspects, the water is rain water.

In some aspects, the specific gravity of the gas hydrate inhibitor is between 0.750 and 1.000 g/mL. In some aspects, the specific gravity is 0.750 g/mL. In some aspects, the specific gravity is 0.800 g/mL. In some aspects, the specific gravity is 0.850 g/mL. In some aspects, the specific gravity is 0.900 g/mL. In some aspects, the specific gravity is 0.950 g/mL. In some aspects, the specific gravity is 1.00 g/mL. In some aspects, the specific gravity is 1.05 g/mL. In some aspects, the specific gravity is 1.10 g/mL.

Also disclosed herein are methods for controlling gas hydrate formation and plugging in a gas hydrate forming fluid. The method comprises combining a gas hydrate inhibitor as described elsewhere herein with the hydrate forming fluid present in crude oil, condensate, and/or gas systems containing water. The amount of the gas hydrate inhibitor is based on the specific application. In some aspects, the amount of gas hydrate inhibitor is sufficient to reduce and/or eliminate the formation of hydrates during the flow of said gas hydrate forming fluid compared to hydrate formation if the gas hydrate inhibitor had not been combined with said gas hydrate forming fluid or hydrocarbon.

In yet another aspect, disclosed herein is a method of transporting hydrocarbon fluids. The method comprises providing a gas hydrate inhibitor as described elsewhere herein, adding said gas hydrate inhibitor to a hydrocarbon fluid capable of producing gas hydrates, and transporting said fluid that comprises the gas hydrate inhibitor.

In some aspects, the hydrate forming fluid is a hydrocarbon. The hydrocarbon may be refined or unrefined, or it may be at an intermediate state in the refining process. The location in which the gas hydrate inhibitor and hydrate forming fluid are combined is not limited, but is selected on the needs of the situation and the nature of the specific hydrate forming fluid. For example, in some aspects, the combination is made in a pipeline where the fluid is transported. In yet another aspect, the combination is made in a well where the fluid is initially extracted. In yet another aspect, the combination is made at a refinery where the fluid is processed. The gas hydrate inhibitor may be added before, simultaneously or after the hydrate forming fluid. For example, the gas hydrate inhibitor may be added simultaneously to the hydrate forming fluid as it enters a pipeline to reduce or eliminate hydrate formation when the hydrate forming fluid is transported through the pipeline. In another example, the gas hydrate inhibitor is added after a hydrate has formed in order to dissolve or reduce the size of the hydrate and the impediment to the flow or transport of the hydrate forming fluid.

The amount of the gas hydrate inhibitor added to the fluid will vary depending on the nature, location and/or temperature of the usage. In some aspects, from about 0.01 gallons to 50 gallons of hydrate inhibitor is added to one million cubic feet of fluid. In some aspects, about 0.05 gallons of hydrate inhibitor is added to one million cubic feet of fluid. In some aspects, about 0.1 gallons of hydrate inhibitor is added to one million cubic feet of fluid. In some aspects, about 0.25 gallons of hydrate inhibitor is added to one million cubic feet of fluid. In some aspects, about 0.50 gallons of hydrate inhibitor is added to one million cubic feet of fluid. In some aspects, about 0.75 gallons of hydrate inhibitor is added to one million cubic feet of fluid. In some aspects, about 1.00 gallons of hydrate inhibitor is added to one million cubic feet of fluid. In some aspects, about 2 gallons of hydrate inhibitor is added to one million cubic feet of fluid. In some aspects, about 3 gallons of hydrate inhibitor is added to one million cubic feet of fluid. In some aspects, about 5 gallons of hydrate inhibitor is added to one million cubic feet of fluid. In some aspects, about 7.5 gallons of hydrate inhibitor is added to one million cubic feet of fluid. In some aspects, about 10 gallons of hydrate inhibitor is added to one million cubic feet of fluid. In some aspects, about 15 gallons of hydrate inhibitor is added to one million cubic feet of fluid. In some aspects, about 20 gallons of hydrate inhibitor is added to one million cubic feet of fluid. In some aspects, about 25 gallons of hydrate inhibitor is added to one million cubic feet of fluid. In some aspects, about 30 gallons of hydrate inhibitor is added to one million cubic feet of fluid. In some aspects, about 35 gallons of hydrate inhibitor is added to one million cubic feet of fluid. In some aspects, about 40 gallons of hydrate inhibitor is added to one million cubic feet of fluid. In some aspects, about 45 gallons of hydrate inhibitor is added to one million cubic feet of fluid.

Some aspects of the methods disclosed herein may involve using the gas hydrate inhibitor described herein in conjunction with subterranean operations. Such operations may include, but are not limited to, drilling operations, lost circulation operations, stimulation operations, sand control operations, completion operations, acidizing operations, scale inhibiting operations, water-blocking operations, clay stabilizer operations, fracturing operations, frac-packing operations, gravel packing operations, wellbore strengthening operations, sag control operations, and the like. The methods and compositions herein may be used in full-scale operations or pills. As used herein, a "pill" is a type of relatively small volume of specially prepared treatment fluid placed or circulated in the wellbore.

Pipelines suitable for using compositions and methods disclosed herein may include, but are not limited to, those having at least a portion of pipeline being about 5° C. or less, or alternatively formations having at least one zone less than about −10° C., pipelines at least partially located in deep sea areas, pipelines at least partially located in arctic areas (e.g., at least portions of Alaska, Canada, Russia, Siberia, and similar regions), and the like, or any combination thereof. Further, suitable pipelines may be at least in part above ground, below ground, underwater, or any combination thereof.

Also disclosed herein are methods of making a gas hydrate inhibitor. The method comprises combining the water and the organic acid while stirring until the solution is homogeneous thereby making a first solution, blending the first solution with the polyol to form a second solution, and combining the second solution with the alcohol in a volume ratio of from 1:9 to 9:1 thereby forming the gas hydrate inhibitor. In some aspects, the second solution and the alcohol are in a volume ratio of 3:1 to 1:3.

In some aspects, a colored dye is added to the solution to enable to solution to be visually distinguishable from other solutions. The colored dye can be any desired color including, but not limited to, red, orange, yellow, green, blue, indigo and violet. In some aspects, the colored dye is blue. In some aspects, the dye is selected for identification purposes only and does not affect the hydrate inhibiting properties of the gas hydrate inhibitor. In some aspects, the color of the dye is selected based on the specific intended use or based on the request of any customer in the supply chain.

Example 1

Preparation of a Gas Hydrate Inhibitor

A stock solution of aqueous ascorbic acid was prepared by adding 30 lbs of ascorbic acid to 330 gallons of purified water. 115.5 gallons of the stock solution was charged in a 330 gallon tote, and 198 gallons off ethylene glycol was added with stirring to make the first solution.

The first solution (115.5 gallons) was combined with methanol (214.5 gallons) and stirred until homogeneous. The final solution had a pH of from about 4.0 to about 4.5, and a specific gravity of from about 0.900 to about 0.910 g/mL. This solution is suitable for use in the methods disclosed herein to reduce, prevent or eliminate the formation of gas hydrates in a hydrocarbon or other fluid.

As various changes could be made in the above processes and compositions without departing from the scope of the invention, it is intended that all matter contained in the above description shall be interpreted as illustrative and not in a limiting sense.

What is claimed is:

1. A gas hydrate inhibitor comprising from 1 to 99% by weight of an alcohol, from 1 to 99% by weight of a polyol, from 0.01 to 2.0% by weight of an organic acid, and from 1 to 99% by weight of water.

2. The gas hydrate inhibitor according to claim 1, wherein the alcohol has 6 or fewer carbon atoms.

3. The gas hydrate inhibitor according to claim 2, wherein the alcohol is selected from the group consisting of methanol, ethanol, propanol, isopropanol, butanol, isobutanol, tert-butanol, n-pentanol, isopentanol, hexanol, isohexanol, cyclobutanol, cyclopentanol, methylcyclopentanol and cyclohexanol.

4. The gas hydrate inhibitor according to claim 3, wherein the alcohol is methanol.

5. The gas hydrate inhibitor according to claim 1, wherein the alcohol comprises from 40 to 60% by weight of the inhibitor.

6. The gas hydrate inhibitor according to claim 1, wherein the polyol has 6 or fewer carbon atoms.

7. The gas hydrate inhibitor according to claim 6, wherein the polyol is ethylene glycol.

8. The gas hydrate inhibitor according to claim 1, wherein the polyol comprises from 25 to 40% by weight of the inhibitor.

9. The gas hydrate inhibitor according to claim 1, wherein the organic acid has 10 or fewer carbon atoms.

10. The gas hydrate inhibitor according to claim 9, wherein the organic acid is selected from the group consisting of formic acid, acetic acid, glyceric acid, xylonic acid, gluconic acid, ascorbic acid, glucuronic acid, galacturonic acid, iduronic acid, tartaric acid, mucic acid and saccharic acid.

11. The gas hydrate inhibitor according to claim 10, wherein the organic acid has two or more acidic functional groups.

12. The gas hydrate inhibitor according to claim 11, wherein at least one of the two or more acidic functional groups has a pKa between 2.0 and 6.0.

13. The gas hydrate inhibitor according to claim 10, wherein the organic acid is ascorbic acid.

14. The gas hydrate inhibitor according to claim 1, wherein the organic acid comprises from 0.01 to 0.1% by weight of the inhibitor.

15. The gas hydrate inhibitor according to claim 1, wherein the water comprises from about 10 to 30% by weight of the inhibitor.

16. The gas hydrate inhibitor according to claim 1, wherein the inhibitor comprises:
    40 to 60 weight percent of methanol;
    25 to 40 weight percent of ethylene glycol;
    0.01 to 0.1 weight percent of ascorbic acid; and
    12 to 25 weight percent of water.

17. A method of making the gas hydrate inhibitor according to claim 1, the method comprising:
    combining the water and the organic acid while stirring until the solution is homogeneous thereby making a first solution;
    blending the first solution with the polyol to form a second solution; and
    combining the second solution with the alcohol in a volume ratio of from 1:9 to 9:1 thereby forming the gas hydrate inhibitor.

18. A method for controlling gas hydrate formation and plugging in a gas hydrate forming fluid, said method comprising:
    combining the gas hydrate inhibitor of claim 1 with the hydrate forming fluid present in crude oil, condensate, and/or gas systems containing water;
    wherein the amount of gas hydrate inhibitor is sufficient to reduce and/or eliminate the formation of hydrates during the flow of said hydrocarbons compared to hydrate formation if the gas hydrate inhibitor had not been combined with said hydrocarbon.

19. A method of transporting hydrocarbon fluids, the method comprising:
    providing the gas hydrate inhibitor according to claim 1;
    adding said gas hydrate inhibitor to a hydrocarbon fluid capable of producing gas hydrates; and
    transporting said fluid that comprises the gas hydrate inhibitor.

* * * * *